United States Patent [19]

Logar et al.

[11] Patent Number: 5,267,596
[45] Date of Patent: Dec. 7, 1993

[54] ANTISKID DEVICE FOR AUTOMOBILE TIRES

[75] Inventors: Ciril Logar; Darko Bartolj, both of Trebnje,

[73] Assignee: "Barlog" proizvodno in trgovsko podjetje, d.o.o., Trebnje,

[21] Appl. No.: 884,169

[22] Filed: May 18, 1992

[30] Foreign Application Priority Data

May 20, 1991 [YU] Yugoslavia .............................. 876/91

[51] Int. Cl.$^5$ .............................................. B60C 27/06
[52] U.S. Cl. ..................................... 152/179; 152/221; 152/213 A
[58] Field of Search ............... 152/167, 171, 172, 173, 152/175, 176, 177, 178, 179, 185, 185.1, 170, 187, 188, 189, 190, 191, 213 A, 222, 221

[56] References Cited

U.S. PATENT DOCUMENTS

| | | | |
|---|---|---|---|
| 1,090,145 | 3/1914 | Haas | 152/72 |
| 2,157,004 | 5/1939 | Nelson, Sr. | 152/191 |
| 3,770,039 | 11/1973 | Pfoertner | 152/221 |
| 3,797,549 | 3/1974 | Lieberum | 152/175 |
| 3,951,194 | 4/1976 | de Previnquieres | 152/221 |
| 4,287,925 | 9/1981 | Spann | 152/221 |

FOREIGN PATENT DOCUMENTS

| | | |
|---|---|---|
| 248387 | 12/1987 | European Pat. Off. . |
| 288882 | 11/1988 | European Pat. Off. . |
| 2537060 | 6/1984 | France . |
| 2135252 | 8/1984 | United Kingdom . |

*Primary Examiner*—Michael W. Ball
*Assistant Examiner*—Francis J. Lorin
*Attorney, Agent, or Firm*—Keck, Mahin & Cate

[57] ABSTRACT

The present invention relates to an antiskid device for mounting on automobile tires, designed to have the form of a segmented plastic envelope. The envelope is composed of tread segments provided with inserted metal spikes, ribs and recesses. Each tread segment provides perforated binding lugs accompanied by appropriate binding elements for interconnection of the tread segments to each other and into an endless form thereof, and for mounting the envelope on a tire. The tread section is characterized by spikes and ribs which are arranged in alternating groups of three spikes and three pairs of ribs. A binding wire, preferably a stranded one is located at the inner side of the envelope and connects the envelope in endless form. Tightening, by outer binding elements of the envelope at the outer side of the tire is made possible by an optionally decorative elastic binding ring and an elastic tightening link.

6 Claims, 1 Drawing Sheet

U.S. Patent
Dec. 7, 1993
5,267,596
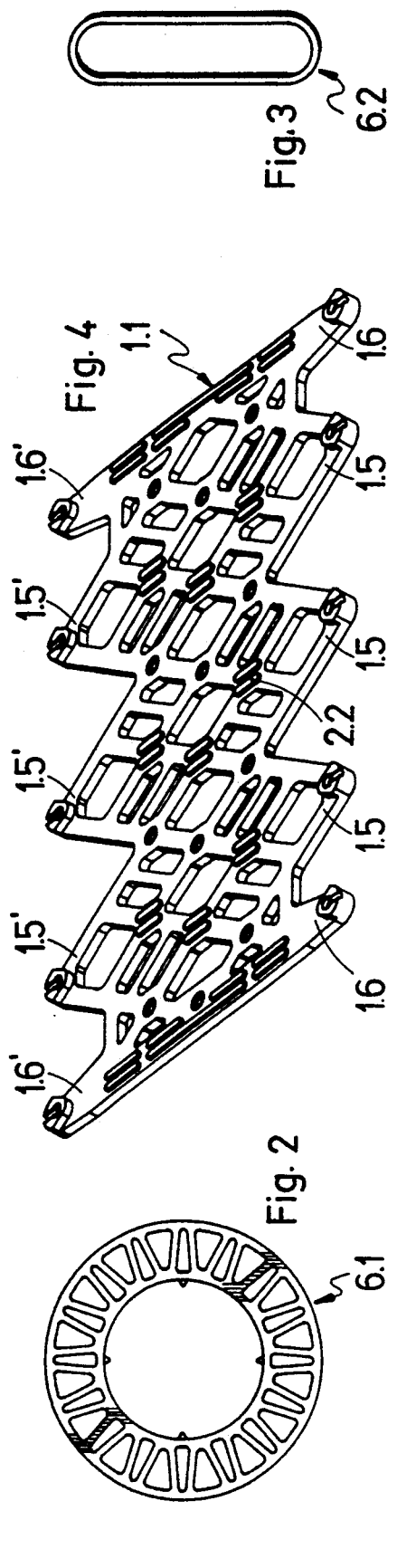
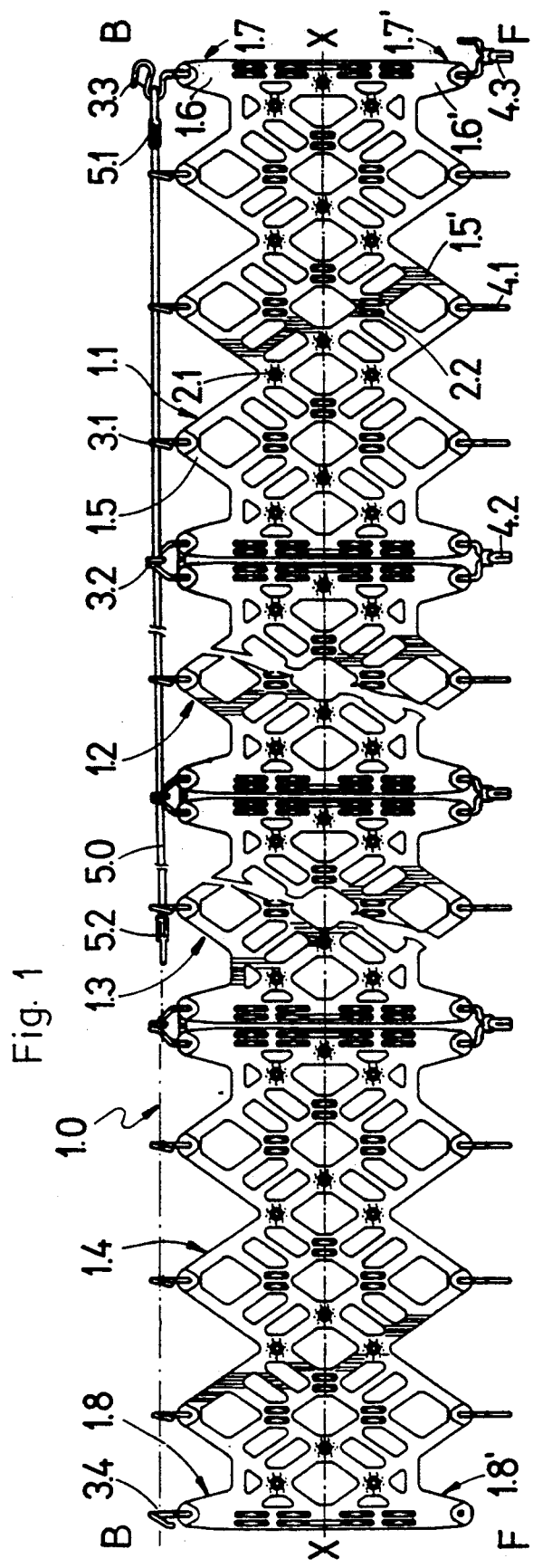

ANTISKID DEVICE FOR AUTOMOBILE TIRES

This inveniton relates to the field of transportation. In more detail, it concerns antiskid devices designed to be mounted at times onto flexible tires or wheels provided with flexible tires.

There are known several devices in this field. Some of them relate to plastic or rubber mats (e.g. Patent Specification GB 2,135,252) and traction-strap-envelopes (e.g. U.S. Pat. No. 4,287,925).

GB 2,135,252 (Ellis) suggests a flexible studded mat attached to the outside of a tired wheel, either singly or in parts, the mat having external studs and also internal studs which engage in the tread of the tire to prevent movement of the mat relative to the wheel. The studs may be mounted with the mat or formed separately and secured to the mat.

It is a first substantial disadvantage of the mentioned prior art that the arrangement of the internal studs must comply with the tread of the tire, i.e., the antiskid means and the tire can only co-operate if they mate. It is another disadvantage of the prior art that the solution might be satisfactory merely on ice, not on snow.

U.S. Pat. No. 4,287,925 (Spann) suggests a pair of annular elastomeric tubular sidewall elements interconnected by a plurality of spaced layered traction straps which provide internal nubs.

The sugestion of this reference involves a substantial disadvantage that the antiskid means might be satisfactory merely on snow, not on ice, and, besides, it does not deal with the question of how to stabilize the direction of moving the vehicle.

In principle, the invention concerns means for improving the grip of tired wheels on the ground, basically characterized in that their main constituent is a sectioned sheet of rubber or plastic.

It is an object of the invention to design a mounting antiskid device for automobile tires, which is applicable in changing weather conditions (snow, ice), during a longer period of time and at higher speeds, not only for use as protection in cases when the usual equipment (summer tire/winter tire) will fail, but also as prevention, i.e. in advance, if changes of weather conditions are to be expected in the course of driving.

The substance of the invention resides in a new mounting antiskid plastic envelope for automobile tires, the envelope composed of rough-pattern tread segments. The term rough-pattern should hereby indicate that, along with diverse elements projecting from the external surface of the sheet, the latter as such provides recesses. Additionally, no element is foreseen to project from the internal side of the sheet.

The number of tread segments can either be even or odd. In a preferred embhodiment, four mutually equal tread segments constitute an envelope.

The pattern of tread segments is designed to intensify friction on whatever ground and to guarantee appropriate flexible and adaptability to the basic tire at the same time, also including the question of how to stabilize the direction of moving the vehicle.

For providing flexibility and adaptability to the basic tire, a series of perforated binding lugs provided by each tread segment, namely, a group of inner/intermediate and a group of outer/intermediate lugs, a pair of inner-/end and a pair of outer/end lugs and thereof, a pair composed of a first inter/termination and a first outer/-termination lugs as well as a pair composed of a last inner/termination and a last outer/termination lugs make it possible, in combination with elected materials, to interconnect the tread segments of the mounting antiskid envelope for automobile tires and to bend them both on the circumference of a tire as well as following the outline of the cross-section of the tire without creating folds.

Here and below, the terms "inner" and "outer", respectively, indicate the inboard side and the outboard side, repsectively, of an incorporated wheel; the terms "end" and "intermediate", respectively refer to portions of a tread segment in its longitudinal (circumferential) direction, whereas the term "termination" indicates a last element of an assembled device, also meant in its longitudinal (circumferential) direction.

Tips of the aforementioned lugs foreseen for binding are reinforced, i.e. thickened, to enhance the durability and to accommodate projecting parts of binding elements defined below.

One pair of termination lugs, composed of an inner and an outer termination lug, and another pair of termination lugs, again composed of an inner and an outer termination lug, of the mounting antiskid envelope make it possible to close the envelope by means of respective binding elements at mounting same on a tire.

At its external side, each end section of the tread segments provides border ribs so as to intensify unevenness of the segment and the grasping abiltiy at touching the ground so as to alleviate the weakening influence of possible interruptions in the circumference of the envelope.

In a preferred embodiment, each tread segment provides sockets accommodating appropriate spikes. Preferably, there are foreseen twelve sockets/spikes in each tread segment. Hereby, the sockets/spikes are arranged in four groups each composed of three sockets/spikes, the socket/spike groups being equally distributed along the tread segment, three sockets/spikes of one socket/spike group forming a triangle symmetrical to the longitudinal axis of the tread segment.

In a preferred embodiment, the four groups of sockets/spikes are separated from each other by three groups of appropriate ribs, the groups of ribs being arranged essentially equally to the groups of sockets/spikes.

Binding elements, such as inner/intermediate binding elements, inner/end binding elements, a first inner/termination binding element, a last inner/termination binding element, as well as outer/intermediate binding elements, outer/end binding elements, a first outer/termination binding element, and a last outer/termination binding element, serve for interconnecting the tread segments, in given case four tread segments, into an assembly as well as for binding them into an annular state, said elements making by means of a stranded wire, a tightening link and an optionally decorative binding ring, possible mounting and fastening of the envelope on a wheel.

The binding stranded wire disposed at the inner side of the assembly provides a metal ear at each end. At assembling and mounting the envelope, according to the invention, the stranded wire is conducted through all inner-side binding elements. Thereat, one of the ears, the one with a single hole, is hooked by an inner/termination binding element.

Technical features required for the tread segments, namely tensile strength, modulus of elasticity, wear-resistance, friction coefficient, flexibility at different temperatures, hardness, resistance against weather influences, resistance against oil, fuel, fats, solvents, and insignificant fatigue deformation, have been met by using a high-quality polyurethane thermoplastic elastomer material.

The metal spikes, as such, are made of special hard alloy and provide specially treated tips, thus attaining hardness and wear-resistance of spikes.

All binding elements are manufactured of a wire thermically treated and surface-protected by an electrolytic zinc process or by cadmium plating.

The stranded wire is coated with a polyester plastic layer. The metal ears, namely one with a single hole and one with two holes, of stranded wire are suitably made by forging.

The binding ring is made of rubber having stable elasticity characteristics and resistant against altering frequency vibrations.

The tightening link similar to an O-ring is foreseen to tighten the envelope on its front, i.e. outer, side. During driving, the tightening force of the tightening link and the binding ring overcome the centrifugal forces generated in the envelope.

Following, the invention is disclosed in more detail on the basis of an embodiment shown in the attached drawings.

FIG. 1 is a plan, partly broken, of a four-segment mounting antiskid envelope for automobile tires, in stretched state-prior to mounting;

FIG. 2 is an elevation of a decoration binding ring;

FIG. 3 is an elevation of a tightening link, and

FIG. 4 is an illustrative representation of a tread segment of the mounting antiskid envelope of FIG. 1.

FIG. 1 represents a stretched plastic envelope 1.0 composed of four mutually equal tread segments 1.1, 1.2, 1.3, 1.4, the first one thereof, 1.1, being separately shown from the opposite side in FIG. 4. On the external, i.e. rolling side, each tread segment 1.1, 1.2, 1.3, 1.4 provides metal spikes 2.1 and ribs 2.2, respectively, arranged in groups, the groups being equally distanced from each other and each consisting of three metal spikes 2.1 and three pairs of ribs 2.2, respectively, arranged to form a triangle symmetrical with respect to the longitudinal axis X-X of the envelope 1.0. On is longitudinal (circumferential) sides, i.e. inner/back, B, and outer/front side F, each tread segment 1.1, 1.2, 1.3, 1.4 provides three perforated inner/intermediate binding lugs 1.5, three preforated outer/intermediate binding lugs 1.5', two perforated inner/end binding lugs 1.6, and two perforated outer/end binding lugs 1.6'.

The inner/end binding lugs 1.6 of the four tread segments 1.1, 1.2, 1.3, 1.4 are interconnected in pairs by means of inner/end binding elements 3.2 and the outer/end binding lugs 1.6' are interconnected in pairs by means of outer/end binding elements 4.2, forming thereby a stretched assembly as shown in FIG. 1. Hereby, the first inner/termination binding lug 1.7 and the first outer/termination binding lug 1.7' belonging to a first tread segment 1.1 as well as the last inner/termination binding lug 1.8 and the last outer/termination binding lug 1.8' belonging to the last tread segment 1.4 remain free to be interconnected at mounting the envelope on a tire.

The inner/intermediate binding lugs 1.5 and the outer/intermediate binding lugs 1.5', respectively, of the treat segments 1.1, 1.2, 1.3, 1.4 provide inner/intermediate binding elements 3.1 and outer/intermediate binding elements 4.1, respectively.

The first inner/end binding lug 1.7 of the tread segment 1.1 proveds a first inner binding element 3.3 which at mounting binds the envelope by means of a binding stranded wire 5.0, more concretely, binds same by means of one of the metal ears 5.1, 5.2 of of the latter, the right one, 5.1, in the embodiment shown, to an annular, i.e. endless, form, whereas the first outer/end binding lug 1.7' of the first tread segment 1.1 provides a first outer/end binding element 4.3 generaly equal to outer/end binding elements 4.2 with a mere difference that it is distinctively coloured to indicate the starting point at dismounting.

The last inner/end binding lug 1.8 of the tread segment 1.4 provides a last inner/end binding element 3.4 foreseen to be hooked by another, i.e. left metal ear 5.2, according to the embodiment shown, of the binding stranded wire 5.0, after the latter has been inserted into the inner/intermediate binding elements 3.1 as well as into the inner/end binding elements 3.2. This is to be performed prior to mounting the envelope onto a tire.

At mounting, the left metal ear 5.2 to be finally hooked by the first inner binding element 3.3 binds the envelope by means of the binding stranded wire 5.0 to an annular, i.e. endless, form.

The last outer/end binding lug 1.8' of the last tread segment 1.4 remains free. It serves for binding the envelope at its outer side by means of the first outer/termination binding element 4.3 when mounting the envelope.

FIG. 2 shows an optionally decorative binding ring 6.1 intended to be hooked by all outer/intermediate, 4.1, outer/end, 4.2, and by the first outer/termination binding element 4.3, when mounting the envelope. The binding ring 6.1 also is preferably designed as a reticular structure. In the embodiment shown, the ring is composed of bar elements enclosing two rows of essentially triangular recesses, the cross-section of bars being preferably circular. As is evident from FIG. 2, there are foreseen four radial indication projections on the inner border of the binding ring 6.1 to indicate the locations of hooking the three outer/end binding elements 4.2 and one outer/termination binding element 4.3.

FIG. 3 shows a tightening link 6.2 designed similarly to an O-ring, said link being together with the decorative/binding ring 6.1 placed onto all binding elements, namely outer/intermediate, 4.1 outer/end, 4.2, and onto the first outer/termination binding element 4.3, and aimed to act as a counterweight to centrifugal forces generated in the envelope, as well as at mounting the envelope serving to tighten same at the front, i.e. outer, side of a wheel.

The proposed mounting antiskid device for automobile tires represents a novelty in the field of antiskid devices. By means of the new article serving as an envelope of a tire, according to the invention, the above-mentioned problems were overcome, and driving in winter under changing weather and driving conditions was simplified in specific manner.

Some advantages of the proposed invention are the following: The riding speed is higher; there is no need for a removal of the device from the tire, although during a longer journey, changing weather conditions, e.g. snow, ice, water, dry road, can be expected; the device can be mounted in advance, as preventive measure, in dry conditions (in a garage); driving is noiseless, i.e. without vibrations; the durability, i.e. mileage, is higher, and the mounting procedure is simple.

Mounting starts from the state as shwon in FIG. 1. The left, i.e. two-hole, ear 5.2 is inserted through all remaining binding elements 3.1, as indicated by a dash-and-dot line in FIG. 1, and hooked by one of its holes at the last inner/end binding element 3.4. Hereby, the stretched form of the assembly is folded to a certain extent (not shown). In such state, the assembly is temporarily attached to the tire and also temporarily fastened on the front side F of the wheel by means of the tightening link 6.2 hooked by some binding elements 4.1, 4.2, e.g. four of them. The maneuver of temporary attachment finished, the wheel is turned (automobile displaced) up to the termination sections of the tread segments 1.1, 1.4 lifted from the ground. The tightening link 6.2 is removed, and on the back side B of the wheel, the binding ear 5.2 is by its remaining hole hooked by the first inner binding element 3.3. Hereafter, on the front side F by the first outer/end binding element 4.3 the last outer/end binding lug 1.8' is connected, and onto all outer binding elements 4.1, 4.2, 4.3 the tightening link 6.2 is placed, and finally the binding ring 6.1 is hooked by the same binding elements.

We claim:

1. A mounting antiskid device for automobile tires comprising:

a segmented plastic envelope composed of tread segments of an elastomer, each of said tread segments having a sheet base including an internal surface and an external surface, metal spikes inserted in said tread segments, perforated binding lugs provided on opposite longitudinal sides of each tread segment, groups of three pairs of ribs on said external surface of said sheet base of each tread segment and projecting therefrom, groups of three spikes, wherein the ribs and spikes are arranged in alternating cquidistant groups of ribs and spikes, each sheet base including recesses in the external surface of the sheet base to intensify roughness of a pattern of the tread, and an assembly of ribs at each end of tread segment terminating a tread pattern provided by each tread segment.

2. The device of claim 1, including intermediate binding lugs of the envelope which provide inner and outer intermediate binding elements and pairs of neighboring inner and outer end binding lugs which are interconnected by inner and outer end binding elements.

3. The device of claim 2, wherein an outer front border of the envelope, formed by a plurality of said longitudinal sides, is strengthened by at least one of an elastic binding ring and an elastic tightening link, and an inner back border thereof is strengthened by a binding wire provided with connecting ears.

4. The device of claim 1, including first inner and first outer termination binding lugs which provide first inner and first outer termination binding elements and a last inner termination binding lug which provides a last inner termination binding element, a last outer termination binding lug being free prior to being hooked by the first outer termination binding element.

5. The device of claim 4, and further comprising a connecting ear, preferably a single-hole ear, a binding wire, preferably a stranded wire, which is hooked by the first inner termination binding element and another connecting ear, preferably a two-hole ear, of the binding wire which is introduced through all inner intermediate binding elements and inner end binding elements and is hooked by the last inner termination binding element as well as by the first inner termination binding element.

6. The device of claim 3, wherein at least one of the tightening link and the binding ring is hooked by all outer intermediate binding elements, outer end binding elements and a first outer termination binding element.

* * * * *